T. O. FRAZIER.
HANGER FOR HARNESS.
APPLICATION FILED OCT. 3, 1912.
1,061,366.
Patented May 13, 1913.
2 SHEETS—SHEET 1.
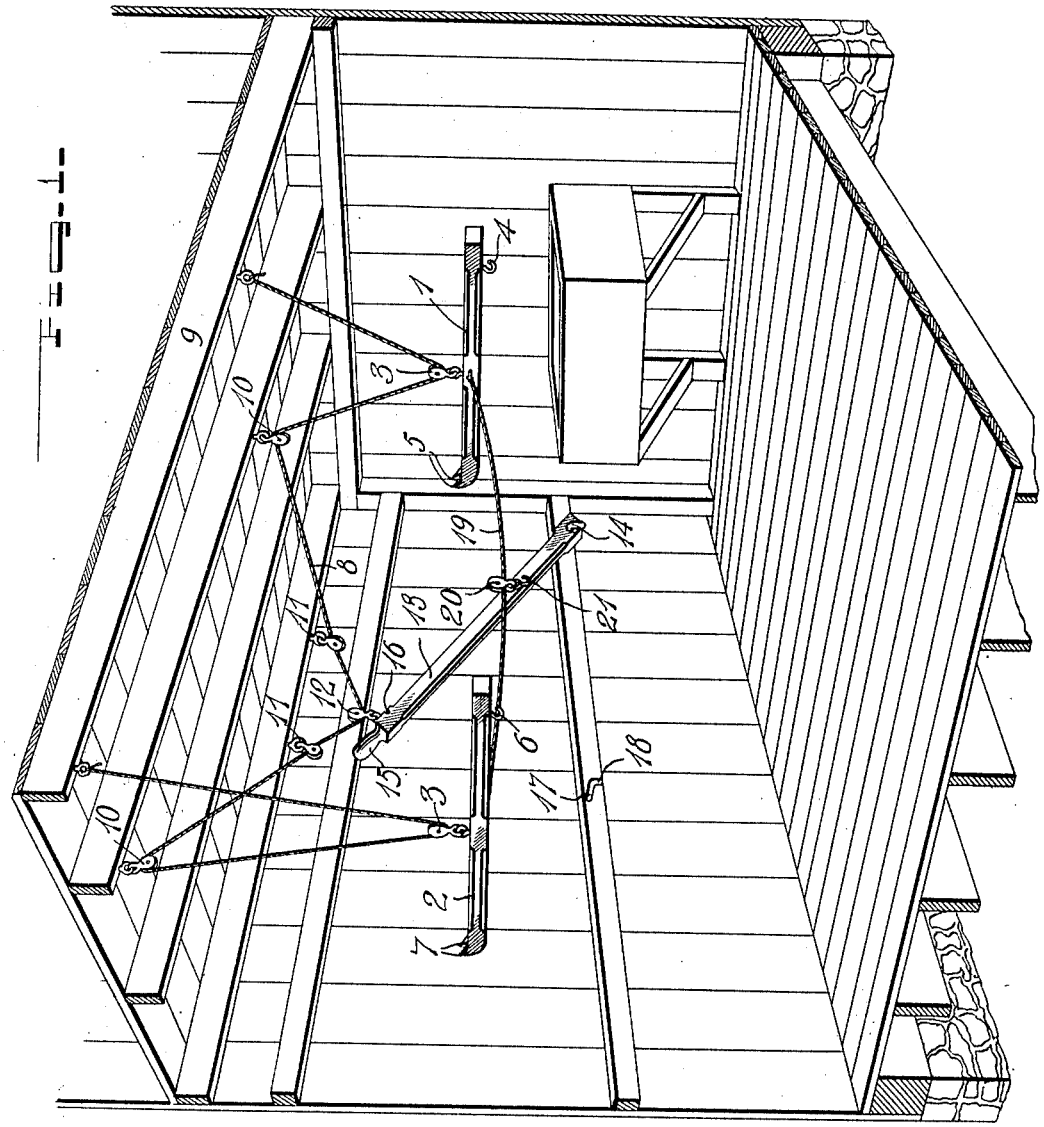
Witnesses
W. H. Rockwell
C. E. Hunt
Inventor
T. O. Frazier
By H. R. Willson & Co.
Attorneys T. O. FRAZIER.
HANGER FOR HARNESS.
APPLICATION FILED OCT. 3, 1912.
1,061,366.
Patented May 13, 1913.
2 SHEETS—SHEET 2.
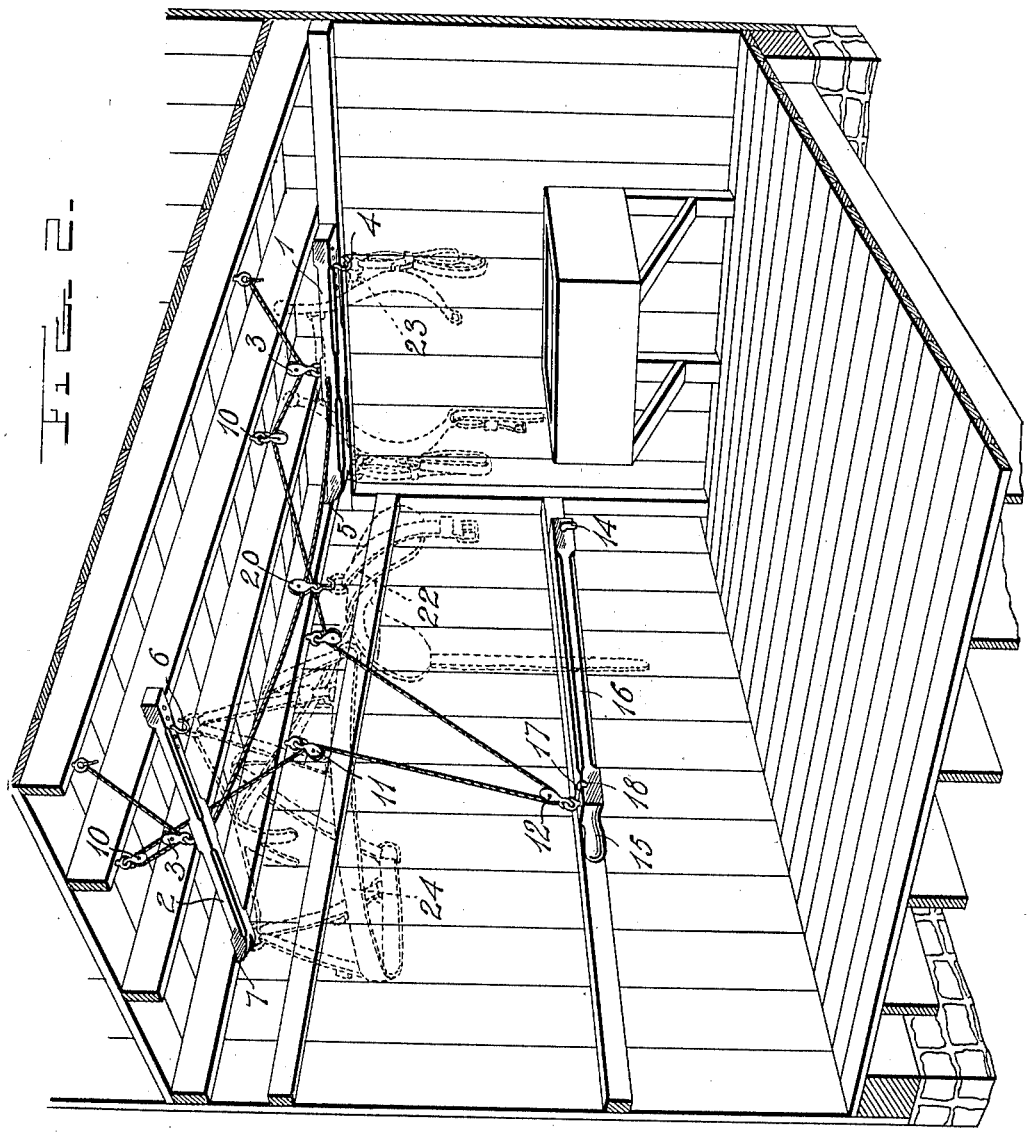
Witnesses
W. H. Rockwell
C. E. Hunt
Inventor
T. O. Frazier
By H. B. Willson & Co.
Attorneys

UNITED STATES PATENT OFFICE.

THOMAS O. FRAZIER, OF PARIS, ILLINOIS.

HANGER FOR HARNESS.

1,061,366.

Specification of Letters Patent.

Patented May 13, 1913.

Application filed October 3, 1912. Serial No. 723,807.

*To all whom it may concern:*

Be it known that I, THOMAS O. FRAZIER, a citizen of the United States, residing at Paris, in the county of Edgar and State of Illinois, have invented certain new and useful Improvements in Hangers for Harness; and I do declare the following to be a full, clear, and exact description of the invention, such as will enable others skilled in the art to which it appertains to make and use the same.

This invention relates to improvements in hangers for harness.

One object of the invention is to provide means for lifting a harness from and hoisting the same above the animal and having means for spreading and holding the harness in position to be lowered onto the animal.

Another object is to provide an apparatus of this character which will be simple, strong, durable and inexpensive in construction, efficient and reliable in operation and by the use of which heavy harness may be readily handled.

With these and other objects in view, the invention consists of certain novel features of construction and the combination and arrangement of parts as will be more fully described and claimed.

In the accompanying drawing: Figure 1 is a perspective view of a portion of a barn showing my improved harness hanger arranged therein and in position to be engaged with the harness. Fig. 2 is a similar view illustrating the hanger in an operative position for supporting a harness the latter being shown attached to the hanger in dotted lines.

My improved harness hanger comprises front and rear spreader bars 1 and 2 to which mid-way between their ends are secured pulleys 3. On the bar 1 near one end is arranged a hook 4. The opposite end of the bar 1 is forked and turned upwardly to a slight extent to form pointed hook shaped lugs 5. The bar 2 has thereon near one end a hook 6 and the opposite end of the bar 2 is forked and turned upwardly to a slight extent to form pointed hook shaped lugs 7.

The spreader bars 1 and 2 are supported and are adapted to be raised and lowered on a hoisting cable 8 the ends of which are suitably secured to an overhead support which in the present instance is shown as the beams 9 of the second floor of the barn in which the apparatus is arranged. The ends of the cable are engaged with the pulleys 3 on the bars 1 and 2 and from said pulleys pass upwardly through guide pulleys 10 and 11 which are also secured to the beams 9.

The pulleys 11 are arranged near one side of the barn or other support and engaged with the portion of the cable which extends between the pulleys 11 is a pulley 12 which is secured to the free end of a hanger operating lever 13. The lever 13 is pivotally secured at its opposite end to the side of the barn or other support as shown at 14 and on its free end is formed a handle 15. In the upper side of the lever 13 adjacent to the free or handle end thereof, is a transverse notch 16 adapted to receive a stop pin 17 with which the free end of the lever is engaged when swung downwardly to an operative position for raising and supporting the hanger. The pin 17 is of sufficient length to extend entirely across the lever 13 and said pin has its end turned downwardly to form a stop lug 18 which will prevent the casual disengagement of the lever from the pin.

Arranged between and connected at its ends with the bars 1 and 2 midway between their ends is a pulley supporting cable 19 with which is slidably engaged a saddle supporting pulley 20 to which is secured a hook 21 adapted to be engaged with a ring, loop or other projection on the saddle 22 of the harness whereby when the device is operated said cable and pulley will raise or lower the saddle of the harness. In attaching the other parts to the harness, the hook 4 in the front bar 1 is engaged with a ring or other suitable part of one of the hames 23 while the lugs formed by the forked opposite end of the bar are engaged with the ring or other suitable part of the other hame. The bar 2 at the opposite end of the hanger is attached to the breeching 24 by the hooks 6 and 7 thereon, said hook 6 being detachably engaged with the ring in one side of the breeching while the hook shaped lugs 7 of the opposite end of the bar 2 are engaged with the ring in the opposite side of the breeching as clearly shown in Fig. 2 of the drawings. The hooks 4 and 6 are preferably in the form of screw hooks whereby the same may be adjustably secured in the bars 1 and 2 to permit said hooks to be arranged at the proper distance from the hooks formed by the forked ends of the bars for engaging and spreading the parts of the harness to which they are applied so that said parts of the harness will be held in position to be readily dropped into their proper places on the animal when standing beneath the harness.

In the operation of the apparatus for removing and hoisting a harness, the animal to be unhitched is driven or led beneath the apparatus. The parts of the harness are then unbuckled and the hooks on the bars 1 and 2 are engaged with the respective parts they are to support and the hook 21 on the pulley 20 of the cable 19 engaged with the saddle of the harness in a manner described. After the hanger has thus been connected with the harness, the lever 13 is swung downwardly thus drawing downwardly on the hoisting cable 8 which operation will raise the spreader bars 1 and 2 and the cable 19, thereby simultaneously lifting all parts of the harness to the desired elevation, in which position the harness is supported or held by the engagement of the lever 13 with the pin 17 as hereinbefore described. When it is desired to place the harness on the animal, the latter is led to the proper position beneath the harness and the lever disengaged from the stop pin 17 and swung upwardly which will permit the parts of the harness to drop into their respective positions on the animal after which the spreader bars and hook 21 on the pulley 20 are disconnected from the harness and the latter fastened to the animal.

By means of my improved hanger, it will be seen that the entire harness is simultaneously removed from the draft animal without being handled except to engage the hooks of the apparatus with the various parts of the harness with which they are to be engaged thus permitting a very heavy farm harness to be removed from the animal and hoisted with very little effort on the part of the operator.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:—

1. A harness hanger comprising a pair of stretcher bars each having one end forked and turned up to provide harness engaging hooks, harness engaging hooks detachably and adjustably secured to the opposite ends of said bars, said hooks and the forked hooks of the bars being adapted to be engaged with parts of the harness whereby said parts are spread apart and held in position to be engaged with the animal, a hoisting cable connected at its ends to an overhead support and having an operating engagement with said bars, a pivoted hoisting lever having an operative connection with said cable whereby the latter may be operated to raise and lower said stretcher bars and the harness attached thereto, and a stop pin adapted to hold said hoisting lever in an operative position.

2. A harness hanger comprising a pair of stretcher bars adapted to be engaged with the parts of a harness, supporting pulleys connected with said bars, a pulley supporting cable arranged between and having its ends secured to said bars, a pulley engaged with said cable, a harness engaging hook carried by said pulley, a hoisting cable engaged with the pulleys on said bars and having its ends secured to an overhead support, guide pulleys secured to said support to receive and guide said hoisting cable, a pivoted lever, a pulley secured thereto and engaged with said hoisting cable whereby when the lever is depressed said cable will be operated to raise said stretcher bars and the harness engaged therewith, and means to fasten said lever in depressed position.

3. A harness hanger comprising a pair of stretcher bars having means at their extremities for engaging a harness, a member connecting said bars and also having harness-engaging means, guide pulleys in an overhead support, a pivoted lever, means for holding it in operative position, a pulley on this lever, and a hoisting cable whose center embraces the lever-pulley and whose two stretches are passed over said guide pulleys respectively and connected beyond them with said stretcher bars.

In testimony whereof I have hereunto set my hand in presence of two subscribing witnesses.

THOMAS O. FRAZIER.

Witnesses:
C. R. HUCKLEBERRY,
H. E. RIVES.